(12) United States Patent
Tamura

(10) Patent No.: US 8,733,197 B2
(45) Date of Patent: May 27, 2014

(54) DRIVE TRANSMISSION MECHANISM AND IMAGE FORMING APPARATUS INCLUDING THE SAME

(75) Inventor: Yuuki Tamura, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 531 days.

(21) Appl. No.: 13/074,116

(22) Filed: Mar. 29, 2011

(65) Prior Publication Data

US 2011/0245032 A1    Oct. 6, 2011

(30) Foreign Application Priority Data

Mar. 31, 2010    (JP) .................................. 2010-080391

(51) Int. Cl.
*F16H 27/02*    (2006.01)
(52) U.S. Cl.
USPC .............................. 74/421 A; 74/414; 74/435
(58) Field of Classification Search
USPC ............ 74/412 R, 413, 414, 421 A, 431, 457, 74/435
See application file for complete search history.

(56) References Cited

U.S. PATENT DOCUMENTS

| | | | | | |
|---|---|---|---|---|---|
| 3,677,463 | A | * | 7/1972 | Grey ......................... | 235/58 CW |
| 3,704,890 | A | * | 12/1972 | Zucker et al. ............. | 273/143 R |
| 3,824,507 | A | * | 7/1974 | Speer et al. ............... | 334/47 |
| 3,918,313 | A | * | 11/1975 | Montagnino .............. | 74/393 |
| 4,057,959 | A | * | 11/1977 | Insley et al. .............. | 368/222 |
| 4,192,136 | A | * | 3/1980 | Robinson ................... | 368/222 |
| 4,347,750 | A | * | 9/1982 | Tersteeg et al. ............ | 73/864.31 |
| 4,523,869 | A | * | 6/1985 | Martin ....................... | 400/629 |
| 4,573,889 | A | * | 3/1986 | Lane .......................... | 418/73 |
| 5,062,014 | A | * | 10/1991 | Yoshimura ................. | 360/96.2 |
| 5,170,757 | A | * | 12/1992 | Gamache .................. | 123/197.4 |
| 5,276,567 | A | * | 1/1994 | Ohashi et al. ............. | 360/69 |
| 6,142,622 | A | * | 11/2000 | Blanchard et al. ........ | 347/104 |
| 8,186,781 | B2 | * | 5/2012 | Coleman et al. .......... | 312/405 |

FOREIGN PATENT DOCUMENTS

| | | |
|---|---|---|
| JP | 56-73243  A | 6/1981 |
| JP | 05-072862 | 3/1993 |
| JP | 6-37785  U | 5/1994 |
| JP | 11-30309 | 2/1999 |
| JP | 2001-12561  A | 1/2001 |
| JP | 2005-106076 | 4/2005 |
| JP | 2006-215294 | 8/2006 |

* cited by examiner

*Primary Examiner* — David M Fenstermacher
(74) *Attorney, Agent, or Firm* — Smith, Gambrell & Russell, LLP

(57) ABSTRACT

A driving force transmission mechanism (40) includes: a first support portion (31) for supporting an end portion of a rotation shaft (1aa) of a photosensitive drum (1a) on a second driving force transmission gear (49) side; a second support portion (33) arranged opposite to the photosensitive drum (1a) across the first support portion (31); a shaft (51) provided so as to protrude from the second support portion (33) to the photosensitive drum (1a) side; and a multi-step gear (47) rotatably supported by the shaft (51), the multi-step gear including a driving force input gear portion (47a) and a driving force output gear portion (47b). Between the driving force input gear portion (47a) and the driving force output gear portion (47b), there is formed a peripheral surface portion (47c) rotatably supported by a bearing member (53) provided into a second through-hole (31a) of the first support portion (31).

15 Claims, 13 Drawing Sheets

US 8,733,197 B2

DRIVE TRANSMISSION MECHANISM AND IMAGE FORMING APPARATUS INCLUDING THE SAME

This application is based upon and claims the benefit of priority from the corresponding Japanese Patent Application No. 2010-080391 filed on Mar. 31, 2010, the entire contents of which are incorporated herein by reference.

BACKGROUND OF THE INVENTION

1. Field of the Invention

The present invention relates to a driving force transmission mechanism for transmitting a rotation driving force to a rotation member, and relates to an image forming apparatus using the driving force transmission mechanism.

2. Description of Related Art

Conventionally, in an image forming apparatus such as a copier, a printer, and a facsimile machine, various rotation members are used. In order to rotate such rotation members, it is necessary to transmit a rotation driving force to each rotation member from a drive source such as a driving motor (not shown). Accordingly, in a driving force transmission mechanism for transmitting the rotation driving force, a multi-step gear having a large speed reduction ratio is disposed between a gear coupled to the driving motor rotating at high speed and a gear provided onto each rotation member, and reduces rotational speed of the each rotation member.

Conventionally, in the driving force transmission mechanism described above, the multi-step gear is supported by a cantilever shaft, and a distance between a center of the multi-step gear and a center of the gear provided onto the rotation member is kept constant. However, in a case of using the cantilever shaft described above, when large load is applied to the multi-step gear, the shaft is bent so that the distance between the centers cannot be sometimes kept constant. As a result, irregular rotation of the rotation member occurs, and there is a fear that image defects caused by the irregular rotation are generated.

In this context, in a drive train to which large load is applied, and in a drive train for which highly accurate rotation is demanded, there is used a driving force transmission mechanism in which both ends of a shaft for holding the multi-step gear are supported. That is, a free end of the cantilever shaft, which is provided so as to protrude from a support portion, is held by a frame or a holder so that both the ends of the shaft are supported. Thus, even in the drive train to which large load is applied and the drive train for which highly accurate rotation is demanded, it is possible to keep constant with high accuracy the distance between the centers of the gears.

As such structure in which the distance between the centers of the gears is kept constant, for example, the following cantilever shaft holding device is given. In the cantilever shaft holding device, a plurality of penetration holes are provided around a holding hole of a shaft support member, and the cantilever shaft is caulked after caused to pass through the holding hole, to thereby be fixed to the shaft support member. Then, after both the ends of the cantilever shaft are positioned, the shaft support member is fixed to another member. With this configuration, the cantilever shaft holding device can increase caulking strength of the cantilever shaft with respect to the shaft support member, and absorb positional displacement of the cantilever shaft by allowing the cantilever shaft to easily bend.

However, the multi-step gear to which large load is applied and the multi-step gear for which highly accurate rotation is demanded are often meshed with a gear provided onto the rotation member that generally serves as a last output portion. Accordingly, in a case of using the attachable/detachable rotation member, it is necessary to provide an attachment/detachment space for the rotation member, and hence it is difficult to provide a space for holding both the end portions of the shaft in the apparatus main body.

SUMMARY OF THE INVENTION

It is an object of the present invention to provide a driving force transmission mechanism capable of keeping constant with high accuracy a distance between a center of a gear of a rotation member and a center of a multi-step gear in a small space, and to provide an image forming apparatus including the driving force transmission mechanism.

In order to achieve the above-mentioned object, the present invention provides a driving force transmission mechanism, including: a first support portion for supporting an end portion of a rotation shaft of a rotation member on a side provided with a gear; a second support portion arranged opposite to the rotation member across the first support portion; a support shaft provided so as to protrude from the second support portion to the rotation member side; and a multi-step gear rotatably supported by the support shaft, for transmitting a rotation driving force from drive means to the gear provided onto the rotation shaft, the multi-step gear including a plurality of gear portions, and a flat peripheral surface portion which is formed between the plurality of gear portions and rotatably supported by a bearing member provided into a through-hole of the first support portion.

According to this configuration, the first support portion for supporting the end portion of the rotation shaft on the gear side, and the second support portion arranged opposite to the rotation member across the first support portion are provided, and the support shaft is provided so as to protrude from the second support portion to the rotation member side. Further, the flat peripheral surface portion is formed between the gear portions of the multi-step gear, the peripheral surface portion being rotatably supported by the bearing member provided into the through-hole of the first support portion. Therefore, it is possible to keep constant with high accuracy the distance between the center of the gear of the rotation member and the center of the multi-step gear in a small space.

Further features and advantages of the present invention will become apparent from the description of an embodiment given below.

DETAILED DESCRIPTION OF PREFERRED EMBODIMENT

Figure 1:
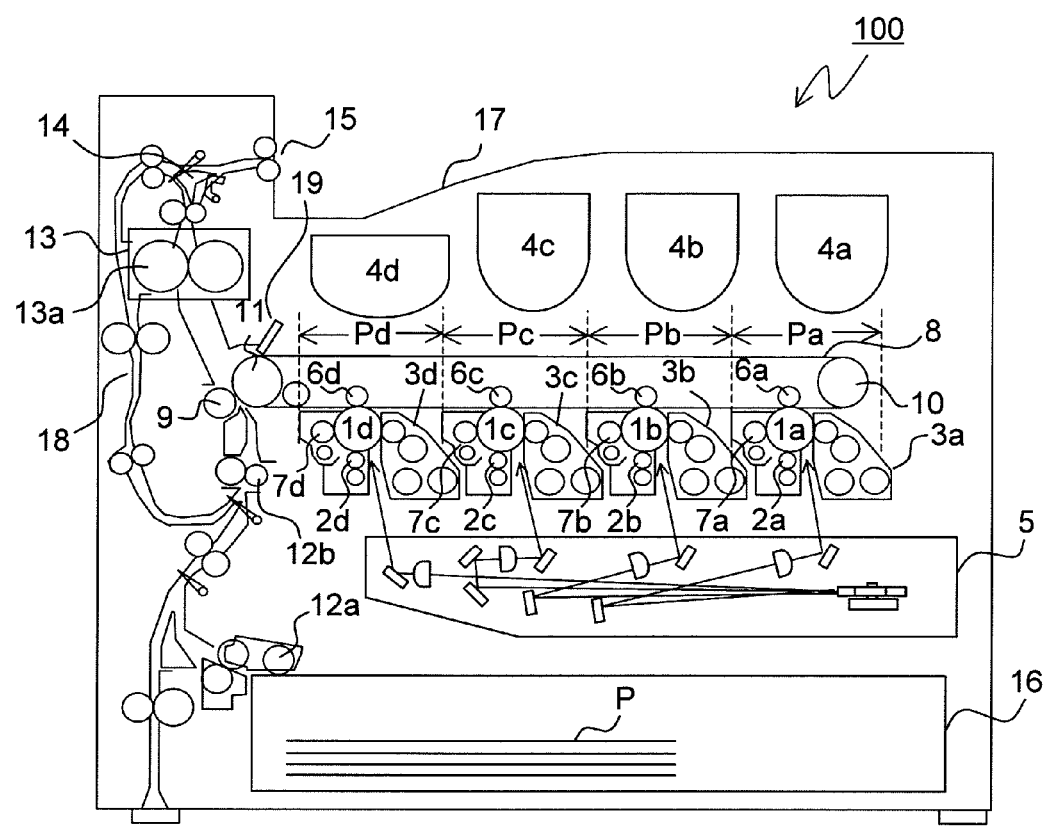
FIG. 1 is a schematic view illustrating a configuration of a tandem-type color image forming apparatus including a driving force transmission mechanism according to an embodiment of the present invention.

In the following, an embodiment of the present invention is described with reference to the drawings. FIG. 1 is a schematic sectional view of an image forming apparatus in which developing devices of the present invention are mounted, and here illustrates a tandem-type color image forming apparatus. In a main body of a color printer 100, four image forming sections Pa, Pb, Pc, and Pd are provided in the stated order from the right side of FIG. 1. The image forming sections Pa to Pd are provided so as to correspond to images of four different colors (cyan, magenta, yellow, and black), and respectively form the images of cyan, magenta, yellow, and black sequentially by respective steps of charging, exposing, developing, and transferring.

In the image forming sections Pa to Pd, there are respectively disposed photosensitive drums 1a, 1b, 1c, and 1d (rotation members) for bearing visible images (toner images) of respective colors, and an intermediate transfer belt 8 which is rotated by drive devices (not shown) clockwise in FIG. 1 is provided adjacent to the respective image forming sections Pa to Pd. The toner images formed on those photosensitive drums 1a to 1d are sequentially primarily transferred onto the intermediate transfer belt 8 moving in abutment with the respective photosensitive drums 1a to 1d so as to be superimposed one on another, and then secondarily transferred onto a transfer paper sheet P being an example of a recording medium by action of a secondary transfer roller 9. In addition, the toner images are fixed onto the transfer paper sheet P at a fixing portion 13, and are then delivered from the apparatus main body. An image forming process is executed on the respective photosensitive drums 1a to 1d while the photosensitive drums 1a to 1d are rotated counterclockwise in FIG. 1.

The transfer paper sheet P onto which the toner images are to be transferred is received within a sheet cassette 16 in a lower portion of the apparatus, and is transported via a sheet feeding roller 12a and a registration roller pair 12b to a nip portion formed between the secondary transfer roller 9 and a drive roller 11 of the intermediate transfer belt 8 described later. A sheet made of a dielectric resin is used for the intermediate transfer belt 8, and a (seamless) belt having no seam is mainly used. Further, a blade-like belt cleaner 19 for removing the toner and the like remaining on a surface of the intermediate transfer belt 8 is arranged on a downstream side of the secondary transfer roller 9.

Next, the image forming sections Pa to Pd are described. Around and below the rotatably disposed photosensitive drums 1a to 1d, there are provided: chargers 2a, 2b, 2c, and 2d for charging the photosensitive drums 1a to 1d, respectively; an exposure device 5 for performing exposure based on image data with respect to the respective photosensitive drums 1a to 1d; developing devices 3a, 3b, 3c, and 3d for forming toner images on the photosensitive drums 1a to 1d, respectively; and cleaning portions 7a, 7b, 7c, and 7d for removing developers (toner) and the like remaining on the photosensitive drums 1a to 1d, respectively.

When image data is input from a host apparatus such as a personal computer, the chargers 2a to 2d first charge surfaces of the photosensitive drums 1a to 1d uniformly, and then the exposure device 5 applies light to the photosensitive drums 1a to 1d correspondingly to the image data to form electrostatic latent images corresponding to the image data on the respective photosensitive drums 1a to 1d. The developing devices 3a to 3d are filled with predetermined amounts of two-component developers containing toner of the respective colors, that is, cyan, magenta, yellow, and black, respectively, and the toner within the developers is supplied onto the photosensitive drums 1a to 1d by the developing devices 3a to 3d. Then, the toner electrostatically adheres to the respective photosensitive drums 1a to 1d, and thus the toner images, which correspond to the electrostatic latent images formed by the exposure performed by the exposure device 5, are formed on the photosensitive drums 1a to 1d. Note that, the respective developing devices 3a to 3d are replenished with toner from respective toner containers 4a to 4d in a case where the proportion of toner within the two-component developers filling the respective developing devices 3a to 3d falls below a preset value because of formation of the toner image.

By applying a predetermined transfer voltage to primary transfer rollers 6a to 6d, the toner images of yellow, cyan, magenta, and black on the photosensitive drums 1a to 1d are primarily transferred onto the intermediate transfer belt 8. The toner images of four colors are formed to have a predetermined positional relationship that is previously defined for forming a predetermined full-color image. After that, in preparation for the formation of new electrostatic latent images to be subsequently performed, the toner and the like remaining on the surfaces of the photosensitive drums 1a to 1d are removed by the cleaning portions 7a to 7d, respectively.

The intermediate transfer belt 8 is stretched around a driven roller 10 on an upstream side thereof and the drive roller 11 on a downstream side thereof. When the intermediate transfer belt 8 starts to rotate clockwise in accordance with the rotation of the drive roller 11 caused by a driving motor (not shown), the transfer paper sheet P is transported from the registration roller pair 12b at a predetermined timing to a nip portion (secondary transfer nip portion) between the drive roller 11 and the secondary transfer roller 9 provided adjacent thereto, and a full-color toner image on the intermediate transfer belt 8 is transferred onto the transfer paper sheet P. The transfer paper sheet P onto which the toner image has been transferred is transported to the fixing portion 13.

The transfer paper sheet P transported to the fixing portion 13 is heated and pressed by a fixing roller pair 13a, and the toner images are fixed to a surface of the transfer paper sheet P to form a predetermined full-color image. The transfer paper sheet P on which the full-color image has been formed is directed toward one of a plurality of transporting directions branched from a branch portion 14. In a case where an image is formed on only one surface of the transfer paper sheet P, the transfer paper sheet P is delivered to a delivery tray 17 by delivery rollers 15 as it is.

On the other hand, in a case where images are formed on both surfaces of the transfer paper sheet P, the transfer paper sheet P that has passed through the fixing portion 13 is temporarily transported toward the delivery rollers 15. Then, after a trailing end of the transfer paper sheet P passes through the branch portion 14, the delivery rollers 15 are rotated reversely, and a transporting direction of the branch portion 14 is switched over. Accordingly, the transfer paper sheet P has the trailing end directed toward a sheet transport path 18, and is again transported to the secondary transfer nip portion under a state in which an image surface is reversed. Then, the next image formed on the intermediate transfer belt 8 is transferred by the secondary transfer roller 9 onto a surface of the transfer paper sheet P on which no image is formed. Then, the transfer paper sheet P is transported to the fixing portion 13, and has the toner images fixed thereto, and then is delivered to the delivery tray 17.

Figure 2:
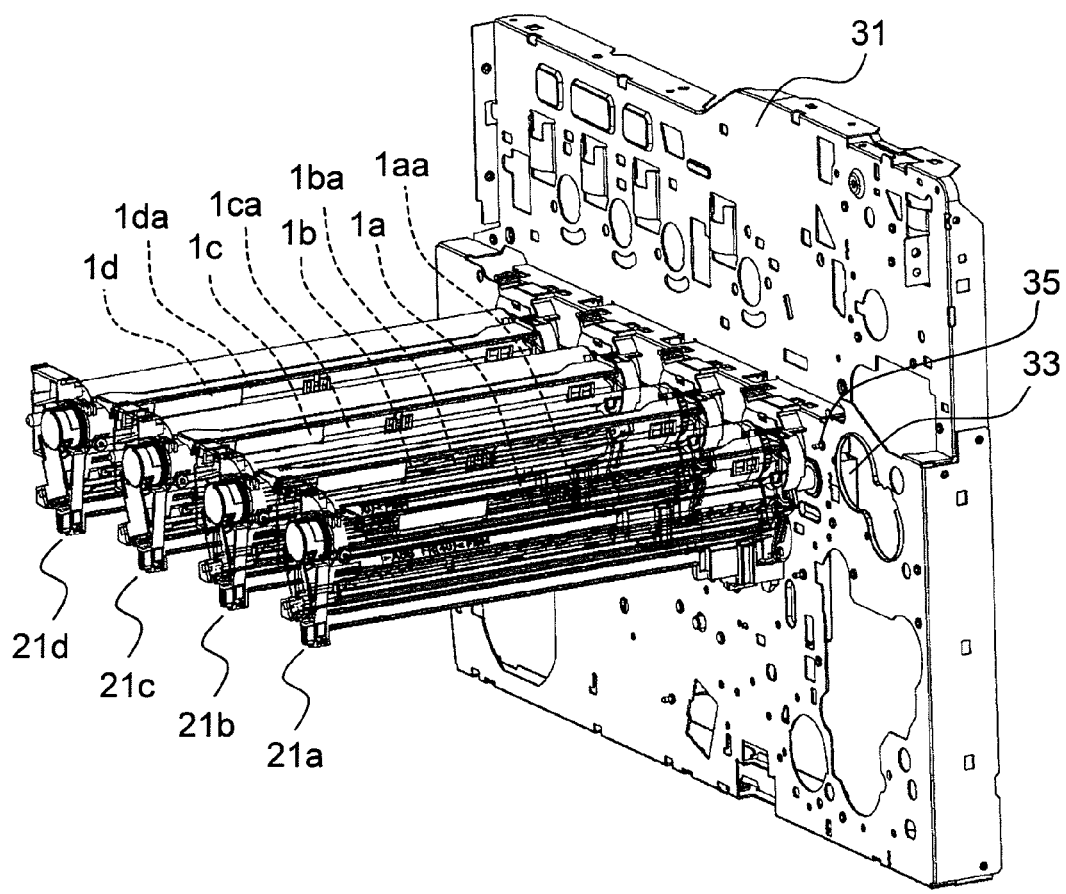
FIG. 2 is a perspective view of a periphery of the driving force transmission mechanism according to the embodiment of the present invention when viewed from a front side.
Figure 3:
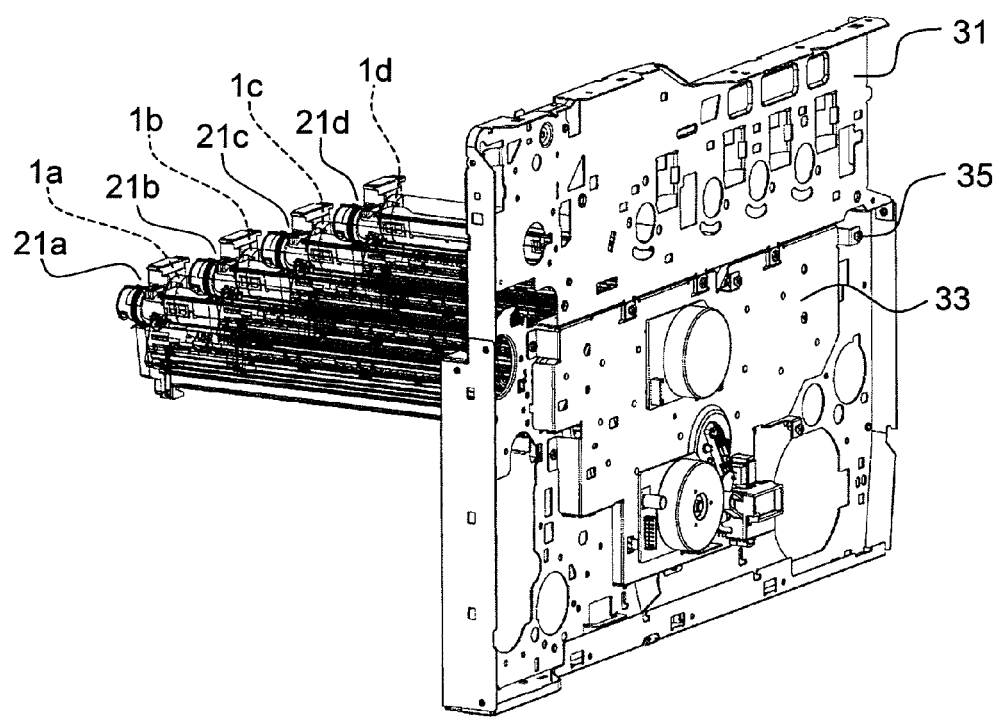
FIG. 3 is a perspective view of the periphery of the driving force transmission mechanism according to the embodiment of the present invention when viewed from a back side.
Figure 4A:
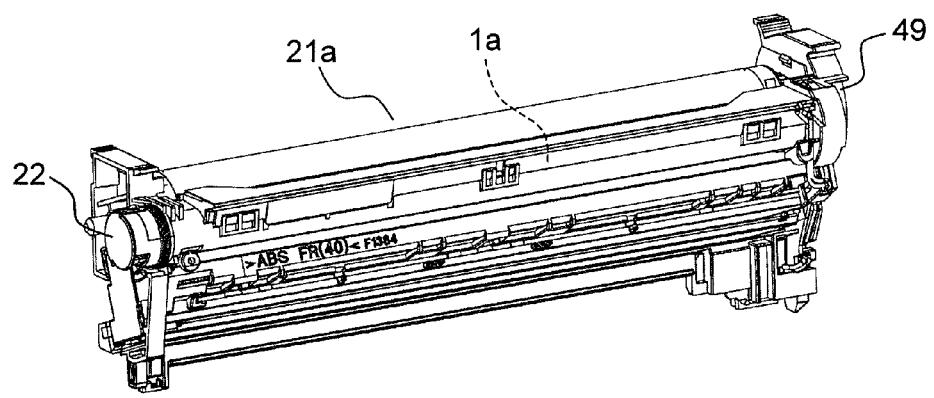
FIG. 4A is a perspective view of a drum unit when viewed from the front side.
Figure 4B:
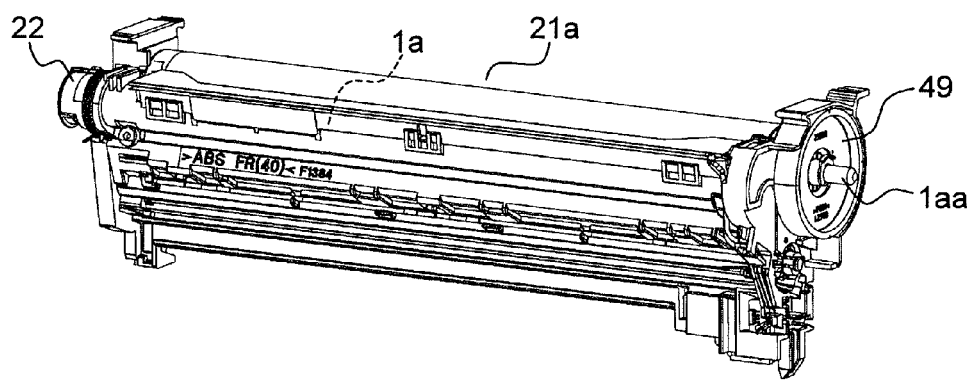
FIG. 4B is a perspective view of the drum unit when viewed from the back side.
Figure 5:
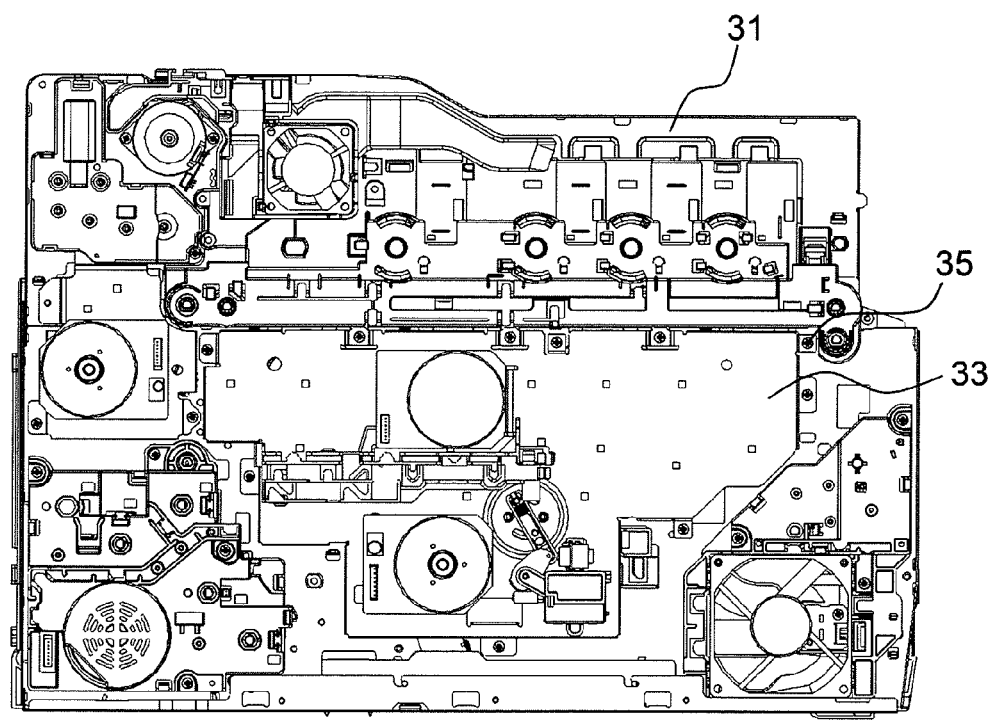
FIG. 5 is a plan view of the periphery of the driving force transmission mechanism according to the embodiment of the present invention when viewed from the back side.

FIG. 2 is a perspective view of a periphery of the driving force transmission mechanism according to this embodiment when viewed from a front side. FIG. 3 is a perspective view of the periphery of the driving force transmission mechanism according to this embodiment when viewed from a back side. FIG. 4A is a perspective view of a drum unit when viewed from the front side. FIG. 4B is a perspective view of the drum unit when viewed from the back side. FIG. 5 is a plan view of the periphery of the driving force transmission mechanism according to this embodiment when viewed from the back side. Portions common to those of FIG. 1 are denoted by common reference symbols, and description thereof is omitted. Further, though FIG. 4A and FIG. 4B illustrate a drum unit 21a including the photosensitive drum 1a, other drum units 21b to 21d have basically the same configuration.

As illustrated in FIG. 2, FIG. 3, FIG. 4A, and FIG. 4B, the photosensitive drums 1a to 1d are provided in the drum units 21a, 21b, 21c, and 21d, respectively. End portions 22 of the drum units 21a to 21d on the front side of the apparatus main body are supported by a frame (not shown). On the other hand, rotation shafts 1aa, 1ba, 1ca, and 1da of the photosensitive drums 1a to 1d protrude to an outer side (back side) from end portions of the drum units 21a to 21d on the back side, respectively, and the rotation shafts 1aa to 1da are rotatably supported by a first support portion 31 formed of a sheet metal member.

The drum units 21a to 21d can be attached to/detached from the apparatus main body, and are inserted into the apparatus main body by being slid in an up-and-down direction, for example, from the upper side to the lower side of FIG. 2 along the first support portion 31. The end portions of the drum units on the front side are supported by the frame (not shown), and end portions of the rotation shafts 1aa to 1da on the back side are supported by the first support portion 31.

Further, as illustrated in FIG. 3, a periphery of a region that is opposed to the drum units 21a to 21d on the back surface of the first support portion 31 is recessed to the front side. As illustrated in FIG. 3 and FIG. 5, onto the recessed region, a second support portion 33 is fixed from the back side with screws 35, the second support portion 33 being formed of a sheet metal member having a substantially U-shaped cross-section that is open toward the first support portion 31.

Figure 6:
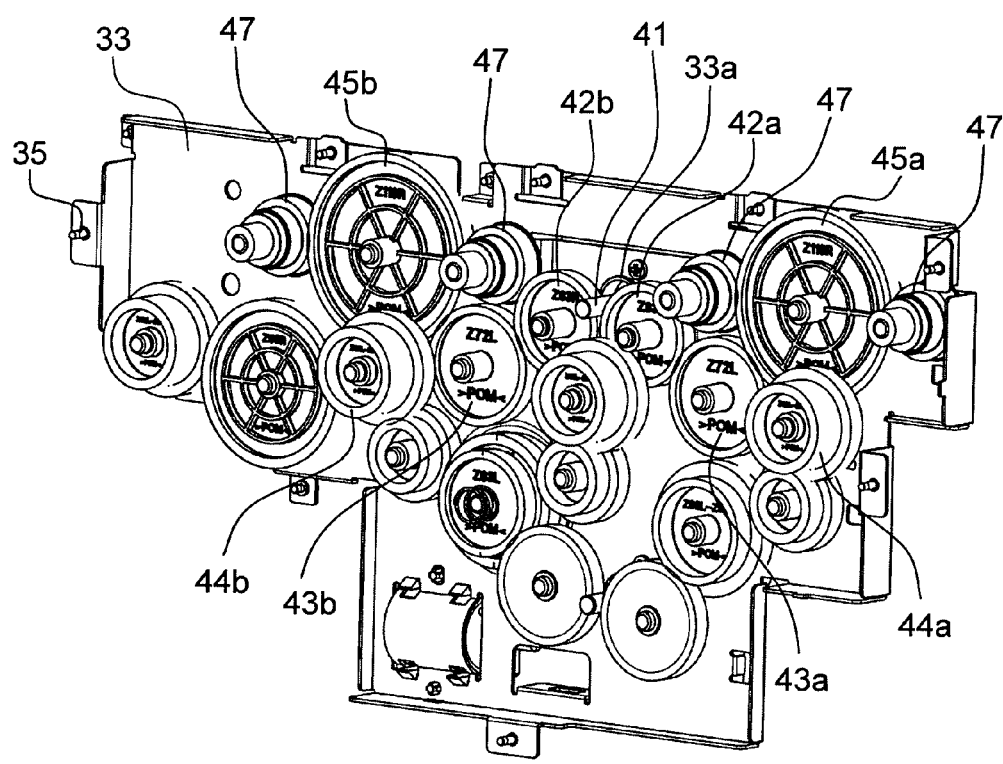
FIG. 6 is a perspective view illustrating a state in which multi-step gears are supported by a second support portion when viewed from the front side.

FIG. 6 is a perspective view illustrating a state in which multi-step gears are supported by the second support portion when viewed from the front side. Portions common to those of FIG. 3 to FIG. 5 are denoted by common reference symbols, and description thereof is omitted. As illustrated in FIG. 6, a first driving force transmission gear 41 to which a rotation driving force is transmitted from the driving motor (not shown) passes through, from the back side to the front side, a first though hole 33a formed in the second support portion 33, to thereby protrude to the front side of the second support portion 33.

In FIG. 6, on the right side of the first driving force transmission gear 41, idle gears 42a, 43a, and 44a and an idle gear 45a are respectively rotatably supported by idle-gear shafts which are provided so as to protrude to the front side from the second support portion 33. The idle gear 42a meshes with the first driving force transmission gear 41, and the idle gear 43a meshes with the idle gear 42a. The idle gear 44a meshes with the idle gear 43a, and the idle gear 45a meshes with the idle gear 44a. Thus, the rotation driving force from the driving motor (not shown) is sequentially transmitted from the first driving force transmission gear 41 to the idle gear 45a.

In FIG. 6, on the left side of the first driving force transmission gear 41, idle gears 42b, 43b, and 44b and an idle gear 45b are respectively rotatably supported by idle-gear shafts which are provided so as to protrude to the front side from the second support portion 33. The idle gear 42b meshes with the first driving force transmission gear 41, and the idle gear 43b meshes with the idle gear 42b. The idle gear 44b meshes with the idle gear 43b, and the idle gear 45b meshes with the idle gear 44b. Thus, the rotation driving force from the driving motor (not shown) is sequentially transmitted from the first driving force transmission gear 41 to the idle gear 45b.

Further, multi-step gears 47 are arranged so as to sandwich the idle gear 45a in a moving direction (right-and-left direction of FIG. 6) of the intermediate transfer belt 8, and so as to sandwich the idle gear 45b in the moving direction of the intermediate transfer belt 8. The rotation driving force from the first driving force transmission gear 41 is input to the four multi-step gears 47, and the rotation driving force is output from the four multi-step gears 47 to the photosensitive drums 1a to 1d. In other words, the multi-step gears 47 transmit the rotation driving force from the driving motor (not shown) to the photosensitive drums 1a to 1d.

Figure 7A:
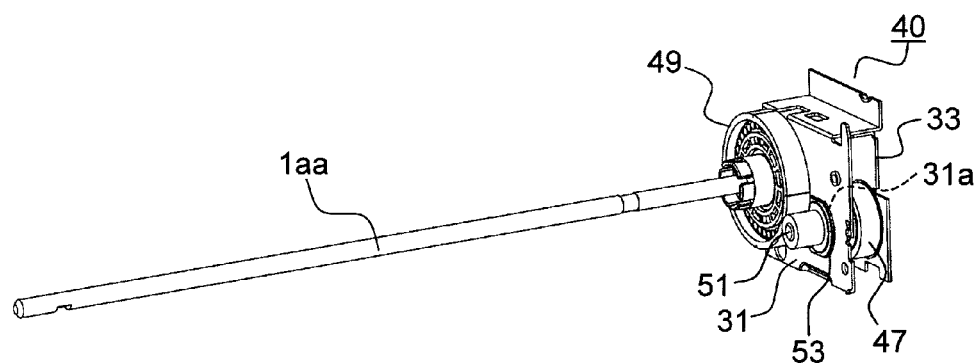
FIG. 7A is a perspective view of a periphery of the multi-step gear of the driving force transmission mechanism when viewed from the front side.
Figure 7B:
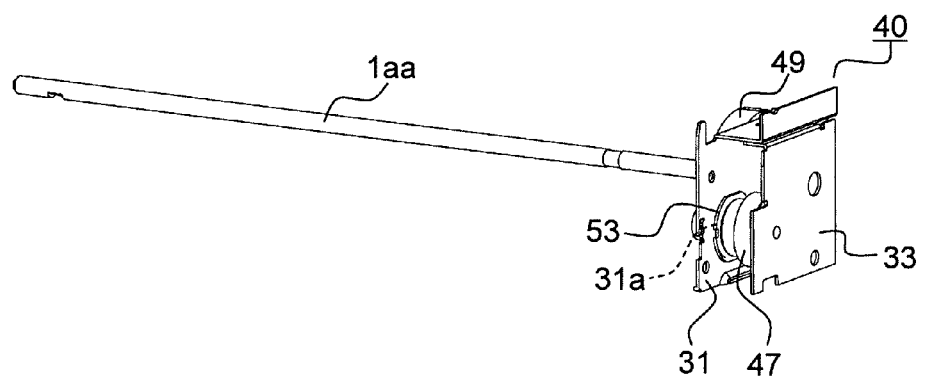
FIG. 7B is a perspective view of the periphery of the multi-step gear of the driving force transmission mechanism when viewed from the back side.
Figure 8A:
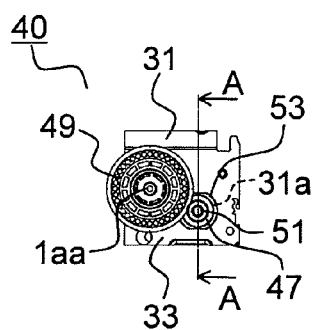
FIG. 8A is a plan view of the periphery of the multi-step gear of the driving force transmission mechanism when viewed from the front side.
Figure 8B:
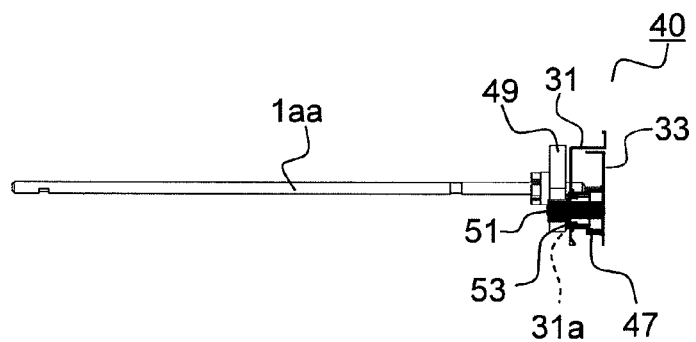
FIG. 8B is a sectional view taken along the arrows AA of FIG. 8A.
Figure 9:
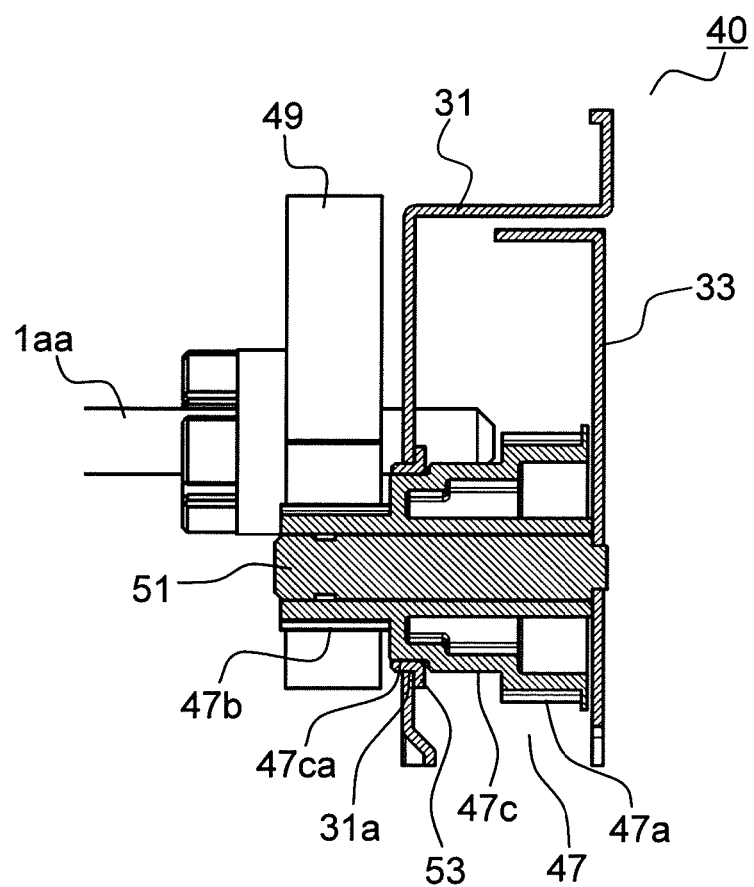
FIG. 9 is an enlarged sectional view of the periphery of the multi-step gear of FIG. 8B.
Figure 10A:
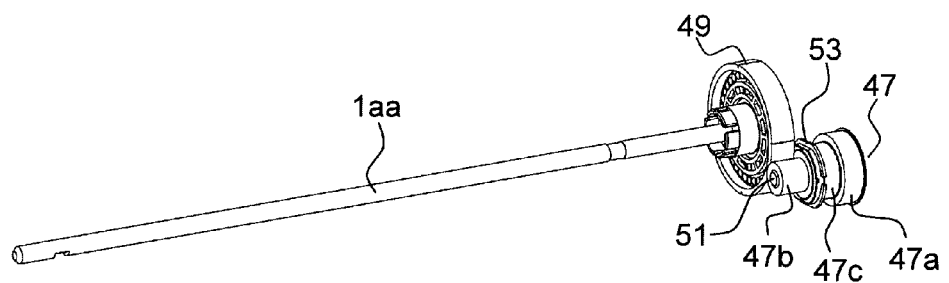
FIG. 10A is a view illustrating a state in which first and second support portions are omitted from the driving force transmission mechanism of FIG. 7A.
Figure 10B:
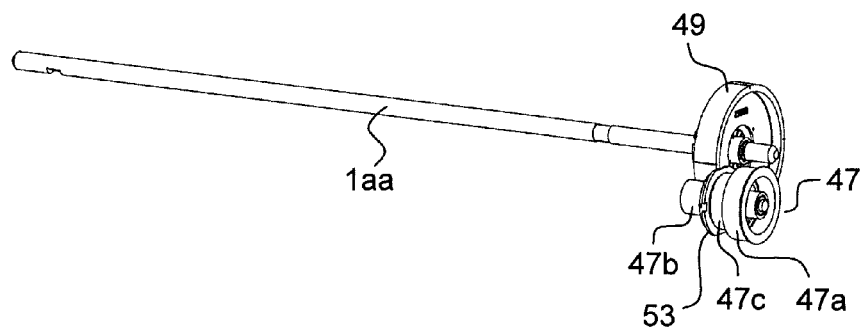
FIG. 10B is a view illustrating a state in which the first and second support portions are omitted from the driving force transmission mechanism of FIG. 7B.
Figure 11:
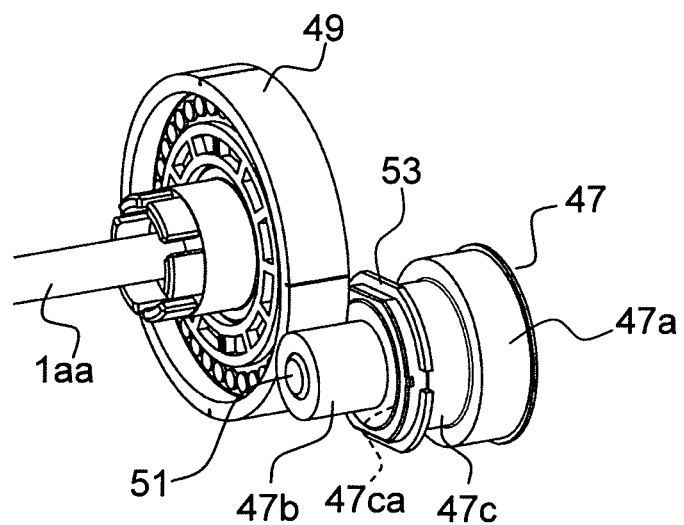
FIG. 11 is an enlarged perspective view of the periphery of the multi-step gear of FIG. 10A.

FIG. 7A is a perspective view of a periphery of the multi-step gear of the driving force transmission mechanism according to the present invention when viewed from the front side. FIG. 7B is another perspective view of the periphery of the multi-step gear when viewed from the back side. FIG. 8A is a plan view of the driving force transmission mechanism according to the present invention when viewed from the front side. FIG. 8B is a sectional view taken along the arrows AA of FIG. 8A. FIG. 9 is an enlarged sectional view of the periphery of the multi-step gear of FIG. 8B. Further, FIG. 10A and FIG. 10B are views illustrating arrangement states of the second driving force transmission gear and the multi-step gear of the driving force transmission mechanism according to the present invention. FIG. 10A is a view illustrating a state in which the first and second support portions are omitted from the driving force transmission mechanism of FIG. 7A, and FIG. 10B is a view illustrating a state in which the first and second support portions are omitted from the driving force transmission mechanism of FIG. 7B. FIG. 11 is an enlarged perspective view of the periphery of the multi-step gear of FIG. 10A.

Here, description is made of transmission of the rotation driving force to the photosensitive drum 1a that is arranged in the image forming section Pa of FIG. 1. However, transmission of the rotation driving force to the photosensitive drums 1b to 1d that are arranged in the image forming sections Pb to Pd, respectively, is basically performed in the similar way, and hence description thereof is omitted. Further, portions common to those of FIG. 3 to FIG. 6 are denoted by common reference symbols, and description thereof is omitted.

As illustrated in FIGS. 7A and 7B, FIGS. 8A and 8B, and FIG. 9, a driving force transmission mechanism 40 includes the first support portion 31, the second support portion 33, a shaft (support shaft) 51, the multi-step gear 47, and a second driving force transmission gear (gear) 49. The multi-step gear 47 is rotatably supported by the shaft 51 provided so as to protrude from the second support portion 33, and transmits the rotation driving force from the driving motor (not shown) to the second driving force transmission gear 49 provided onto the rotation shaft 1aa of the photosensitive drum 1a.

Here, the multi-step gear 47 is configured as a two-step gear, and includes a driving force input gear portion (gear portion) 47a and a driving force output gear portion (gear portion) 47b. As illustrated in FIG. 6 described above, the driving force input gear portion 47a is meshed with the idle gear 45a (or the idle gear 45b), and the rotation driving force from the driving motor (not shown) is input to the driving force input gear portion 47a.

On the other hand, the driving force output gear portion 47b is meshed with the second driving force transmission gear 49 provided onto the rotation shaft 1aa of the photosensitive drum 1a, and outputs the rotation driving force to the second driving force transmission gear 49. Further, the driving force input gear portion 47a is arranged on the second support portion 33 side with respect to the driving force output gear portion 47b, and the outer diameter of the driving force input gear portion 47a is formed to be larger than the outer diameter of the driving force output gear portion 47b.

Between the driving force input gear portion 47a and the driving force output gear portion 47b of the multi-step gear 47, a flat peripheral surface portion 47c is formed. At an end portion of the peripheral surface portion 47c on the driving force output gear portion 47b side, an annular step portion 47ca is formed. The annular step portion 47ca is supported by a bearing member 53 provided into a second through-hole (through-hole) 31a formed in the first support portion 31.

The outer diameter of the annular step portion 47ca is set to be slightly larger than the outer diameter of the driving force output gear portion 47b. Further, the inner diameter of the bearing member 53 is set to be substantially equal to the outer diameter of the annular step portion 47ca, and by causing the driving force output gear portion 47b to pass through the bearing member 53 from the back side to the front side thereof, the annular step portion 47ca is rotatably supported by the bearing member 53.

Next, assembly of the driving force transmission mechanism 40 is described. First, the multi-step gear 47 is fitted onto the shaft 51 that is provided so as to protrude from the second support portion 33. Next, under a state in which the shaft 51 supports the multi-step gear 47, the second support portion 33 is brought close to the first support portion 31 from the back side, and the driving force output gear portion 47b of the multi-step gear 47 is inserted into the bearing member 53. Then, the driving force output gear portion 47b passes through the bearing member 53, and thus the annular step portion 47ca of the peripheral surface portion 47c is supported by the bearing member 53.

Then, the second support portion 33 is fixed to the first support portion 31 with the screws 35 (see FIG. 3 and FIG. 5). In this way, the driving force transmission mechanism 40 is assembled, and the shaft 51 that is provided so as to protrude from the second support portion 33 is supported by the first support portion 31 through the peripheral surface portion 47c. That is, the shaft 51 is supported by the second support portion 33 and the first support portion 31. At this time, the driving force input gear portion 47a is arranged between the first support portion 31 and the second support portion 33, and the driving force output gear portion 47b protrudes from the first support portion 31 to the front side (side opposite to the second support portion 33), which allows space saving.

In this state, the drum unit 21a is inserted into the apparatus main body, and the rotation shaft 1aa of the photosensitive drum 1a is supported by the first support portion 31. With this configuration, as illustrated in FIGS. 10A and 10B and FIG. 11, the second driving force transmission gear 49 and the driving force output gear portion 47b mesh with each other. At this time, as illustrated in FIGS. 7A and 7B and FIGS. 8A and 8B, on the front side of the first support portion 31, only the driving force output gear portion 47b is arranged in the periphery of the second driving force transmission gear 49, and hence it is possible to easily attach and detach the drum unit 21a. Further, it is easy to replace the multi-step gear 47 from the back side of the first support portion 31 under a state in which the drum unit 21a is attached.

Figure 12A:
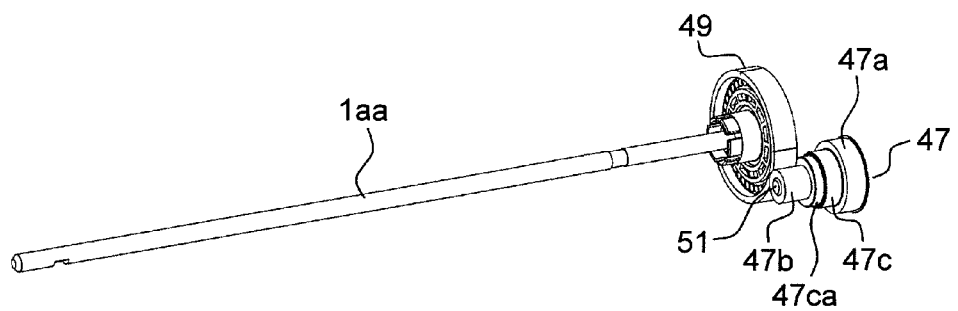
FIG. 12A is a view illustrating a state in which a bearing member is omitted from the driving force transmission mechanism of FIG. 10A.
Figure 12B:
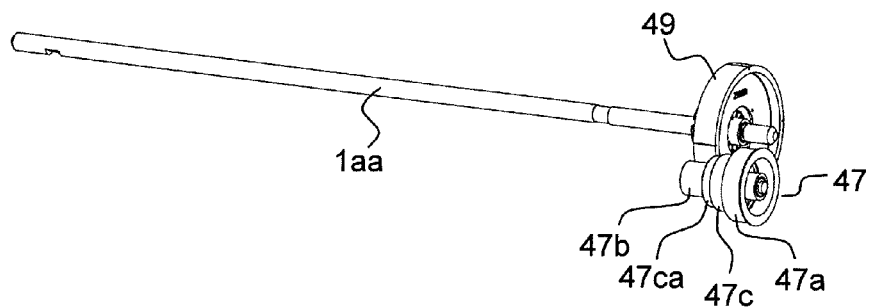
FIG. 12B is a view illustrating a state in which the bearing member is omitted from the driving force transmission mechanism of FIG. 10B.
Figure 13:
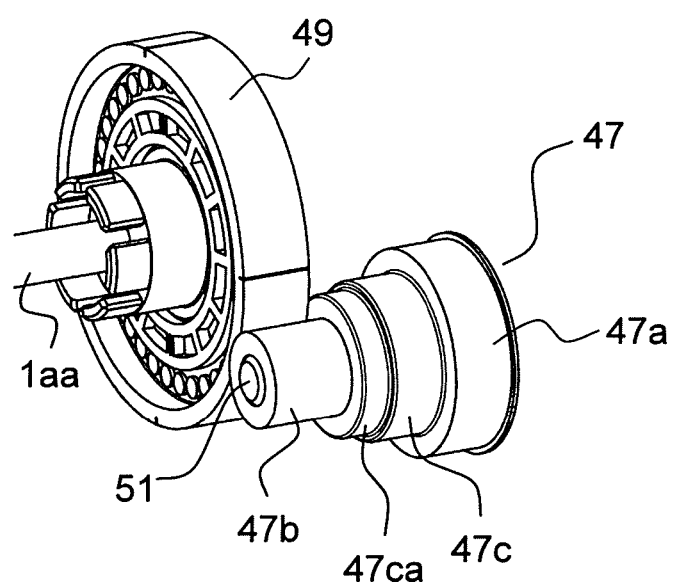
FIG. 13 is an enlarged perspective view of the periphery of the multi-step gear of FIG. 12A.

Next, the rotation driving force transmission performed by the driving force transmission mechanism 40 is described. FIG. 12A and FIG. 12B are views illustrating a coupling state of the second driving force transmission gear and the multi-step gear of the driving force transmission mechanism according to the present invention. FIG. 12A is a view illustrating a state in which the bearing member is omitted from the driving force transmission mechanism of FIG. 10A. FIG. 12B is a view illustrating a state in which the bearing member is omitted from the driving force transmission mechanism of FIG. 10B. FIG. 13 is an enlarged perspective view of the periphery of the multi-step gear of FIG. 12A. Portions common to those of FIG. 7 to FIG. 9 are denoted by common reference symbols, and description thereof is omitted.

As illustrated in FIG. 6, the rotation driving force is input to the driving force input gear portion 47a of the multi-step gear 47 from the driving motor (not shown) through the first driving force transmission gear 41 and the idle gears 42a to 45a. When the rotation driving force is input to the driving force input gear portion 47a, as illustrated in FIG. 12A, FIG. 12B, and FIG. 13, the rotation driving force is output to the driving force output gear portion 47b meshing with the second driving force transmission gear 49, and thus the rotation shaft 1aa rotates. Consequently, the photosensitive drum 1a rotates. At this time, the shaft 51 is supported by the first support portion 31 and the second support portion 33, and hence it is possible to prevent the shaft 51 from inclining.

As described above, the driving force transmission mechanism 40 includes the first support portion 31 for supporting the end portion of the rotation shaft 1aa on the second driving force transmission gear 49 side, and the second support portion 33 arranged opposite to the photosensitive drum 1a across the first support portion 31. Further, the shaft 51 is provided so as to protrude from the second support portion 33 to the photosensitive drum 1a side, and the flat peripheral surface portion 47c is formed between the driving force input gear portion 47a and the driving force output gear portion 47b of the multi-step gear 47, the peripheral surface portion 47c being rotatably supported by the bearing member 53 provided into the second through-hole 31a of the first support portion 31. Thus, it is possible to support the shaft 51 by the first support portion 31 and the second support portion 33. Accordingly, it is possible to prevent the shaft 51 from inclining, and to keep constant with high accuracy a distance between the center of the second driving force transmission gear 49 and the center of the multi-step gear 47.

In addition, the shaft 51 is supported by the first support portion 31 through the peripheral surface portion 47c, and thus an interval between the first support portion 31 and the second support portion 33 supporting the shaft 51 can be made smaller than a length between both axial end portions of the shaft 51. With this configuration, it is possible to reduce the space for the driving force transmission mechanism. Therefore, it is possible to keep constant with high accuracy the distance between the center of the second driving force transmission gear 49 and the center of the multi-step gear 47 in a small space. Further, the drum unit 21a can be easily taken out.

Here, a lubricant (grease) is often applied between the first driving force transmission gear 41 and the idle gears 42a and 42b meshing with the first driving force transmission gear 41. The lubricant is diffused to the idle gears 43a to 45a sequentially meshing with the idle gear 42a and to the idle gears 43b to 45b sequentially meshing with the idle gear 42b, and is finally spread onto the driving force input gear portions 47a of the multi-step gears 47.

When the lubricant moves from the driving force input gear portion 47a to the driving force output gear portion 47b in the multi-step gear 47 and further moves to the second driving force transmission gear 49 meshing with the driving force output gear portion 47b, there is a fear that the lubricant adheres onto the surface of the photosensitive drum 1a to cause a trouble in image formation. Regarding this matter, in this embodiment, the first support portion 31 partitions the driving force input gear portion 47a and the driving force output gear portion 47b, and hence it is possible to inhibit the lubricant from moving to the photosensitive drum 1a side.

Further, in this embodiment, the second support portion 33 is fixed to the first support portion 31, and hence it is possible to further achieve space saving. However, instead, the second support portion 33 may be fixed to a holder or the like that is provided in the apparatus main body separately from the first support portion 31.

Further, in this embodiment, the annular step portion 47ca is formed in the peripheral surface portion 47c, and the annular step portion 47ca is supported by the bearing member 53. Thus, it is possible to further stabilize the support of the peripheral surface portion 47c performed by the first support portion 31. Further, it is possible to position the second support portion 33 with respect to the first support portion 31, and thus it is possible to keep constant the interval between the first support portion 31 and the second support portion 33. With this, it is possible to stabilize the meshing between the driving force output gear portion 47b and the second driving force transmission gear 49. Further, the annular step portion 47ca and the bearing member 53 are engaged with each other, and thus it is possible to more reliably inhibit the above-mentioned lubricant from moving to the photosensitive drum 1a side.

Further, in this embodiment, the annular step portion 47ca is formed in the peripheral surface portion 47c at a position furthest away from the second support portion 33, and hence it is possible to increase the interval between the first support portion 31 and the second support portion 33. With this, it is possible to support the shaft 51 more stably. However, arrangement of the annular step portion 47ca in the peripheral surface portion 47c may be set as needed depending on the configuration of the apparatus main body, such as a space around the multi-step gear 47.

Further, in this embodiment, though the multi-step gear 47 includes two gear portions (two-step gear), the number of the gear portions is not particularly limited, but may be set as needed depending on the configuration of the apparatus, etc. Note that, in a case where the multi-step gear 47 is configured to include three or more gear portions, it is preferred that the peripheral surface portion 47c be formed in the multi-step gear 47 at a position that is between the gear portions and furthest away from the second support portion 33. With this configuration, it is possible to increase the interval between the first support portion 31 and the second support portion 33, and thus it is possible to support the shaft 51 more stably.

However, when the bearing member 53 can support the peripheral surface portion 47c, the arrangement of the annular step portion 47ca in the peripheral surface portion 47c is not particularly limited, and the configuration in which no annular step portion 47ca is provided in the peripheral surface portion 47c may be employed.

Further, as described above, in view of the point that the larger interval between the first support portion 31 and the second support portion 33 enables the shaft 51 to be stably supported, in a case where, for example, the multi-step gear 47 is formed of a gear having three or more steps, it is preferred that the peripheral surface portion 47c be formed at a position that is between the gear portions and furthest away from the second support portion 33.

In addition, the present invention is not limited to the above-mentioned embodiment, and various modifications are possible within a scope of the gist of the present invention. For example, it is possible to set tooth shapes of the driving force input gear portion 47a and the driving force output gear portion 47b of the above-mentioned multi-step gear 47 as needed depending on the configuration of the apparatus, etc., and a spur gear shape and a bevel gear shape may be used.

Further, in the above-mentioned embodiment, the present invention is applied to the multi-step gears 47 arranged in the image forming sections Pa to Pd, for transmitting the rotation driving force to the photosensitive drums 1a to 1d. Therefore, even in the image forming sections Pa to Pd in which highly accurate transmission of the rotation driving force is demanded, it is possible to achieve sufficiently highly accurate transmission of the rotation driving force, and to suppress occurrence of image defects. However, the driving force transmission mechanism of the present invention is not particularly limited to a driving force transmission mechanism for transmitting drive to the photosensitive drums 1a to 1d, but may be instead applied to, for example, a driving force transmission mechanism or the like for transmitting the rotation driving force to the intermediate transfer belt 8.

Further, in the above-mentioned embodiment, the tandem-type image forming apparatus for color printing using an intermediate transfer method is exemplified, but the present invention is also applicable to another image forming apparatus and is not particularly limited. For example, the present invention is also applicable to a tandem-type image forming apparatus using a direct transfer method, a color copier, a monochrome printer for black-and-white printing, a monochrome copier, and the like. In addition, the present invention is also applicable to driving force transmission for precision equipment, electronic devices, and the like other than the image forming apparatus.

What is claimed is:

1. A driving force transmission mechanism, comprising:
    a first support portion for supporting an end portion of a rotation shaft of a rotation member on a side provided with a gear;
    a second support portion arranged opposite to the rotation member across the first support portion;
    a support shaft provided so as to protrude from the second support portion to the rotation member side; and
    a multi-step gear rotatably supported by the support shaft, for transmitting a rotation driving force from drive means to the gear provided onto the rotation shaft, the multi-step gear comprising a plurality of gear portions arranged adjacent to one another in an axial direction of the support shaft and rotating together, and a flat peripheral surface portion which is formed between at least two gear portions of the plurality of gear portions and which is rotatably supported by a bearing member provided into a through-hole of the first support portion.

2. A driving force transmission mechanism according to claim 1, wherein the second support portion is fixed to the first support portion.

3. A driving force transmission mechanism according to claim 1, wherein the peripheral surface portion comprises an annular step portion formed therein.

4. A driving force transmission mechanism according to claim 3, wherein the step portion is formed at an end portion of the peripheral surface portion on the first support portion side, and has an outer diameter smaller than an outer diameter of the peripheral surface portion.

5. A driving force transmission mechanism according to claim 2, wherein the peripheral surface portion comprises an annular step portion formed therein.

6. A driving force transmission mechanism according to claim 5, wherein the step portion is formed at an end portion of the peripheral surface portion on the first support portion side, and has an outer diameter smaller than an outer diameter of the peripheral surface portion.

7. A driving force transmission mechanism according to claim 3, wherein the step portion is supported by the bearing member.

8. A driving force transmission mechanism according to claim 5, wherein the step portion is supported by the bearing member.

9. A driving force transmission mechanism according to claim 1, wherein the peripheral surface portion is formed in the multi-step gear at a position which is furthest away from the second support portion.

10. A driving force transmission mechanism according to claim 9, wherein the peripheral surface portion comprises an annular step portion formed therein, the step portion being supported by the bearing member, and
    wherein the step portion is formed at an end portion of the peripheral surface portion on the first support portion side, and has an outer diameter which is smaller than an outer diameter of the peripheral surface portion and larger than an outer diameter of one of the plurality of gear portions furthest away from the second support portion.

11. A driving force transmission mechanism according to claim 8, wherein the peripheral surface portion is formed in the multi-step gear at a position which is between furthest away from the second support portion.

12. A driving force transmission mechanism according to claim 11, wherein the step portion is formed at an end portion of the peripheral surface portion on the first support portion side, and has an outer diameter which is smaller than an outer diameter of the peripheral surface portion and larger than an outer diameter of one of the plurality of gear portions furthest away from the second support portion.

13. A driving force transmission mechanism according to claim 1, wherein the plurality of gear portions provided in the multi-step gear are formed so that an outer diameter of one of the plurality of gear portions provided on the second support portion side is larger than an outer diameter of another of the plurality of gear portions provided on the first support portion side.

14. An image forming apparatus, comprising the driving force transmission mechanism according to claim 1.

15. An image forming apparatus, comprising the driving force transmission mechanism according to claim 13.

* * * * *